US007554948B2

(12) United States Patent  
Naguib et al.

(10) Patent No.: US 7,554,948 B2  
(45) Date of Patent: Jun. 30, 2009

(54) RECEPTION OF H-ARQ TRANSMISSIONS WITH INTERFERENCE CANCELLATION IN A QUASI-ORTHOGONAL COMMUNICATION SYSTEM

(75) Inventors: Ayman Fawzy Naguib, Cupertino, CA (US); Alexei Gorokhov, San Diego, CA (US); Dhananjay Gore, San Diego, CA (US); Tingfang Ji, San Diego, CA (US); Arak Sutivong, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 361 days.

(21) Appl. No.: 11/147,830

(22) Filed: Jun. 7, 2005

(65) Prior Publication Data

US 2006/0274691 A1 Dec. 7, 2006

(51) Int. Cl.
*H04W 4/00* (2009.01)
(52) U.S. Cl. .................. 370/330; 370/319; 370/349
(58) Field of Classification Search .................. 370/206, 370/208, 330, 349, 319
See application file for complete search history.

(56) References Cited

U.S. PATENT DOCUMENTS

| 6,141,393 | A  | * | 10/2000 | Thomas et al. ............. 375/347 |
| 2002/0136184 | A1 | * | 9/2002 | Liang et al. ................ 370/338 |
| 2003/0043778 | A1 | * | 3/2003 | Luschi et al. ............... 370/349 |
| 2004/0131007 | A1 |   | 7/2004 | Smee et al. |
| 2005/0025039 | A1 | * | 2/2005 | Hwang et al. .............. 370/206 |
| 2005/0130663 | A1 | * | 6/2005 | Hong et al. ................. 455/445 |

FOREIGN PATENT DOCUMENTS

| WO | WO 2004/032436 | * | 4/2004 |
| WO | WO2004032436 |   | 4/2004 |
| WO | WO2004102891 |   | 11/2004 |

OTHER PUBLICATIONS

Das, Arnab et al., Adaptive Asynchronous Incremental Redundancy (A-IR) With Fixed Transmission Time Intervals (TTI) For HSDPA, IEEE, 2002, pp. 1083-1087.
International Search Report—PCT/US06/020611—International Search Authority, US—May 23, 2007.
Written Opinion—PCT/US06/020611—International Search Authority, US—May 23, 2007.
International Preliminary Report on Patentability—PCT/US06/020611—The International Bureau of WIPO, Geneva, Switzerland—Dec. 11, 2007.

* cited by examiner

*Primary Examiner*—Nay A Maung
*Assistant Examiner*—Tuan H Nguyen
(74) *Attorney, Agent, or Firm*—Mary Fales

(57) ABSTRACT

To receive packets with interference cancellation, block transmissions for the packets are received on time-frequency blocks used by these packets. Receiver spatial processing is performed on input symbols to obtain detected symbols. Each packet is demodulated and decoded based on all detected symbols obtained for all block transmissions received for the packet. For each packet that is decoded correctly, the transmission for the packet is terminated, the interference due to the packet is estimated, and the estimated interference is subtracted from the input symbols for all time-frequency blocks used by the packet. Receiver spatial processing is performed on the interference-canceled symbols to obtain new detected symbols for all time-frequency blocks used by all correctly decoded packets. Each packet decoded in error and overlapping at least partially with any correctly decoded packet may be demodulated and decoded based on all detected symbols available for that packet.

35 Claims, 8 Drawing Sheets

RECEPTION OF H-ARQ TRANSMISSIONS WITH INTERFERENCE CANCELLATION IN A QUASI-ORTHOGONAL COMMUNICATION SYSTEM

BACKGROUND

I. Field

The present invention relates generally to communication, and more specifically to techniques for receiving data in a wireless communication system.

II. Background

A wireless multiple-access communication system can concurrently communicate with multiple terminals on the forward and reverse links. The forward link (or downlink) refers to the communication link from the base stations to the terminals, and the reverse link (or uplink) refers to the communication link from the terminals to the base stations. Multiple terminals may simultaneously transmit data on the reverse link and/or receive data on the forward link. This is often achieved by multiplexing the multiple data transmissions on each link to be orthogonal to one another in time, frequency and/or code domain. Complete orthogonality among the multiple data transmissions is typically not achieved in most instances due to various factors such as channel conditions, receiver imperfections, and so on. Nevertheless, the orthogonal multiplexing ensures that the data transmission for each terminal minimally interferes with the data transmissions for the other terminals.

In an orthogonal multiple-access system, the number of terminals that may communicate with a base station at any given moment is limited by the number of orthogonal dimensions available for data transmission. The number of available orthogonal dimensions may be determined by the number of available orthogonal codes in a code division multiple access (CDMA) system, the number of available frequency subbands in a frequency division multiple access (FDMA) system, or the number of available time slots in a time division multiple access (TDMA) system. In many instances, it is desirable to allow more terminals to simultaneously communicate with the base station in order to improve system capacity. However, if the number of communicating terminals exceeds the number of available orthogonal dimensions, then these terminals would interfere with one another, and the interference may degrade performance for all terminals.

There is therefore a need in the art for techniques to support simultaneous communication for more terminals in a multiple-access communication system.

SUMMARY

Techniques for processing packets with interference cancellation are described herein. The packets may be transmitted by terminals sharing the same time frequency resources using frequency hopping and hybrid automatic repeat request (H-ARQ). Each packet may be transmitted in one or more blocks on one or more time-frequency blocks used for the packet. The H-ARQ transmission for each packet can terminate whenever the packet is decoded correctly or the maximum number of blocks have been transmitted for the packet. At a receiver (e.g., a base station), block transmissions for packets are received on time-frequency blocks used by these packets. Receiver spatial processing is performed on input symbols to obtain detected symbols, as described below. Each packet is demodulated and decoded based on all detected symbols obtained for all block transmissions received for the packet. If at least one packet is decoded correctly, then the H-ARQ transmission for each correctly decoded packet is terminated, e.g., by sending an acknowledgment (ACK) for the packet. The interference due to each correctly decoded packet is estimated, e.g., by encoding and modulating the packet in the same manner performed by the transmitter and multiplying the resultant symbols with the channel estimates for the packet. The estimated interference due to each correctly decoded packet is subtracted from the input symbols for the time-frequency block(s) used by that packet. Receiver spatial processing is then performed on the interference-canceled symbols for all time-frequency blocks used by the correctly decoded packets to obtain new detected symbols for packets decoded in error and transmitted on the same time-frequency blocks as the correctly decoded packets. Each packet decoded in error and overlapping at least partially (i.e., sharing any time-frequency block) with any correctly decoded packet may be demodulated and decoded based on all detected symbols available for that packet.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
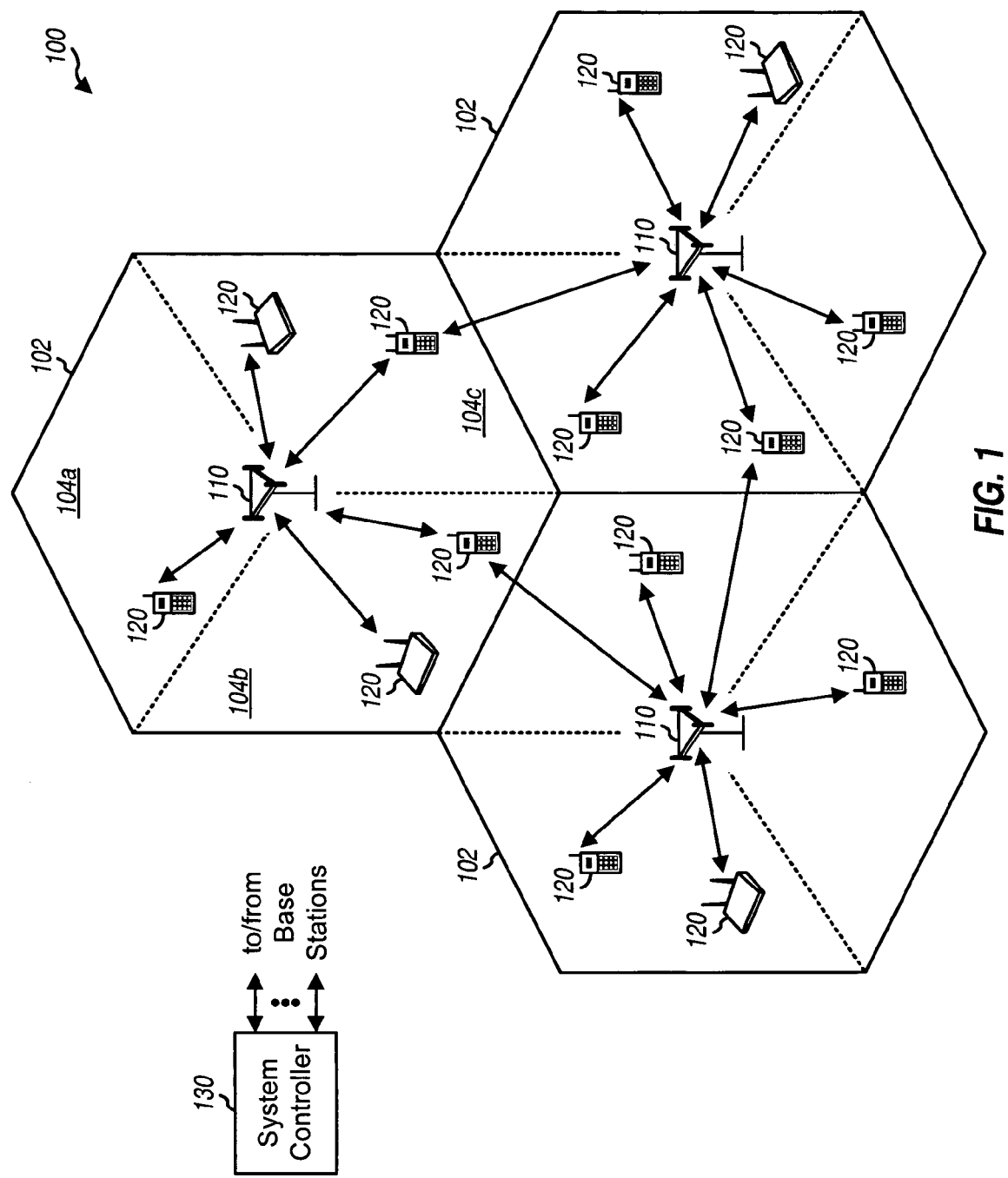
FIG. 1 shows a multiple-access communication system.

FIG. 1 shows a quasi-orthogonal multiple-access communication system 100, which is also called a quasi-orthogonal division access (QODA) system. System 100 includes base stations 110 and terminals 120. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, the base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. For simplicity, the term "base station" is used generically herein for both a fixed station that serves a cell and a fixed station that serves a sector. For a centralized architecture, a system controller 130 provides coordination and control for base stations 110.

A terminal may be fixed or mobile and may also be called a mobile station, a wireless device, a user equipment, or some other terminology. Each terminal may communicate with zero, one, or multiple base stations at any given moment. In the following description, the terms "terminal" and "user" are used interchangeably.

System 100 may utilize orthogonal frequency division multiplexing (OFDM), which is a multi-carrier modulation technique that partitions the overall system bandwidth into multiple (K) orthogonal frequency subbands. These subbands are also called tones, subcarriers, bins, frequency channels, and so on. Each subband is associated with a respective subcarrier that may be modulated with data. Modulation symbols are effectively sent in the frequency domain with OFDM. System 100 may also utilize interleaved FDMA (IFDMA) or narrowband FDMA (NFDMA). IFDMA transmits data and/or pilot on subbands that are uniformly spaced apart across the K subbands. NFDMA transmits data and/or pilot on adjacent subbands among the K subbands. Modulation symbols are effectively sent in the time domain with IFDMA and NFDMA.

System 100 may define traffic channels to facilitate allocation and use of the available system resources. A traffic channel is a means for sending data over the air and may also be called a channel, a physical channel, a data channel, a transmission channel, and so on. Traffic channels may be defined for various types of system resources such as frequency and time.

Figure 2:
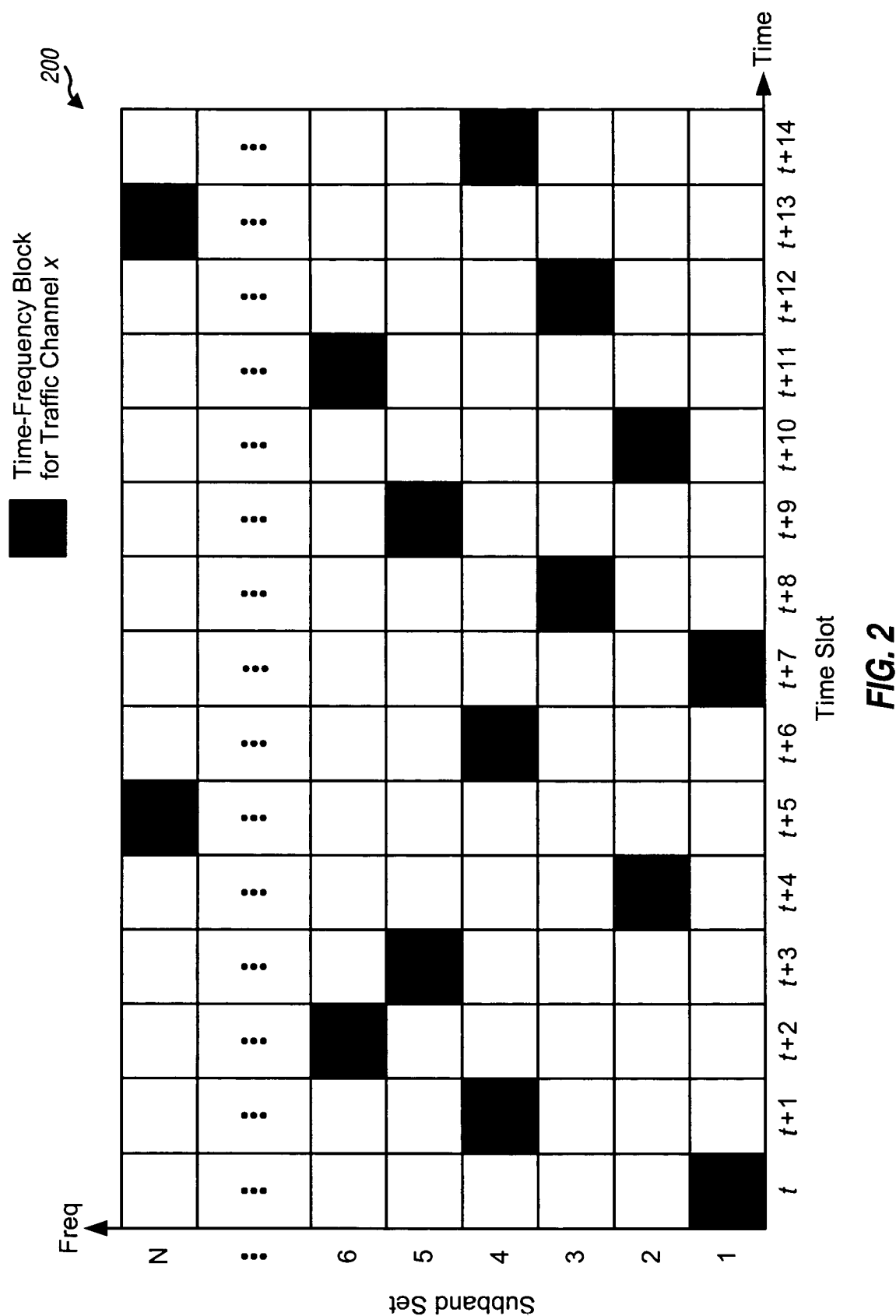
FIG. 2 shows partitioning of time and frequency into time-frequency blocks.

FIG. 2 shows an exemplary partitioning of time and frequency into time-frequency blocks. A time-frequency block may also be called a transmission unit or some other terminology. Each time-frequency block corresponds to a specific subband set in a specific time slot. The subbands may be formed with OFDM, IFDMA, NFDMA, or some other modulation technique. A subband set may include one or multiple subbands, which may be contiguous or distributed across the system bandwidth. A time slot may span one or multiple symbol periods and may also be called a slot, a time interval, a hop period, and so on. A symbol period is the time duration over which a modulation symbol is transmitted. N time-frequency blocks are available in each time slot, where N>1.

FIG. 2 also shows an exemplary mapping of a traffic channel to a specific sequence of time-frequency blocks. The time-frequency blocks for the traffic channel may hop across frequency in different time slots to achieve frequency diversity, as shown in FIG. 2. The traffic channel may be associated with a frequency hopping (FH) pattern that indicates the specific time-frequency block to use for the traffic channel in each time slot usable for data transmission.

In an embodiment of quasi-orthogonal multiplexing (QOM), multiple (M) sets of traffic channels are defined, with each set containing multiple (N) traffic channels. Each traffic channel is mapped to one time-frequency block in each time slot used for data transmission and is associated with a specific sequence of time-frequency blocks. The N traffic channels in each set are orthogonal to one another and no two traffic channels in the set use the same time-frequency block. The M channel sets overlap one another, and M traffic channels in the M sets map to each time-frequency block. As used herein, "overlap" and "overlapping" refer to the use of the same time-frequency block for multiple traffic channels, packets, transmissions, and so on.

Random or common overlapping may be used for the M channel sets. For random overlapping, the channel-to-resource mapping for a traffic channel in a channel set is pseudo-random with respect to the channel-to-resource mappings for the traffic channels in each of the other M−1 channel sets. Random overlapping can provide intra-sector interference diversity. For common overlapping, the channel-to-resource mapping for a traffic channel in a channel set is the same as the channel-to-resource mapping for one traffic channel in each of the other M−1 channel sets. Hence, M traffic channels map to and exclusively reuse the same sequence of time-frequency blocks. Common overlapping may be used for terminals that are spatially decorrelated. For both random and common overlapping, receiver spatial processing techniques may be used to separate out overlapping transmissions on the same time-frequency block.

A total of M·N traffic channels are available for use in the system. For simplicity, the following description assumes that each terminal may be assigned one traffic channel. For a given number of terminals (U) scheduled for transmission, a minimum number of channel sets (L) may be used for these terminals in order to minimize intra-sector interference, where L=⌈U/N⌉≦M and "⌈x⌉" denotes a ceiling operator that provides an integer value that is equal to or greater than x. Each scheduled terminal may be assigned a traffic channel from among the L channel sets.

The system may employ H-ARQ, which is also called incremental redundancy (IR) transmission. With H-ARQ, a transmitter sends one or multiple transmissions for a data packet until the packet is decoded correctly by a receiver or the maximum number of transmissions has been sent. H-ARQ improves reliability for data transmission and supports rate adaptation for packets in the presence of changes in channel conditions.

Figure 3:
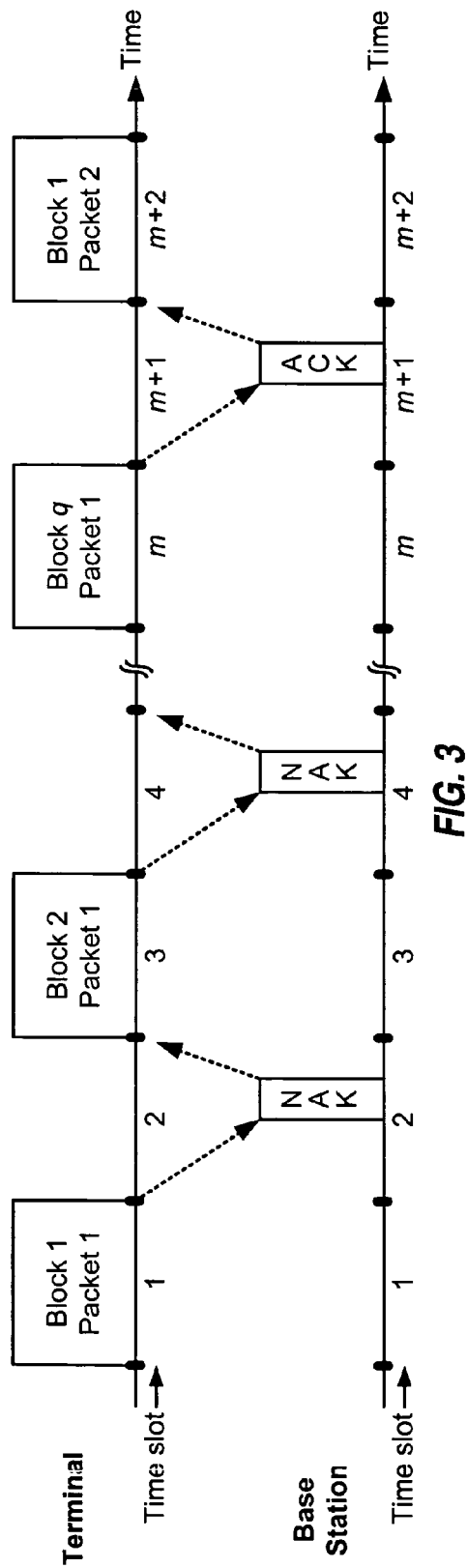
FIG. 3 illustrates an H-ARQ transmission on the reverse link.

FIG. 3 illustrates H-ARQ transmission on the reverse link. A terminal processes (e.g., encodes and modulates) a data packet (Packet 1) and generates multiple (Q) data blocks, where Q>1. A data block may also be called a frame, a subpacket, or some other terminology. Each data block for the packet may contain sufficient information to allow a base station to correctly decode the packet under favorable channel conditions. The Q data blocks contain different redundancy information for the packet. Each data block may be sent in any number of time slots. For the example shown in FIG. 3, each data block is sent in one time slot.

The terminal transmits the first data block (Block 1) for Packet 1 in time slot 1. The base station receives and processes (e.g., demodulates and decodes) Block 1, determines that Packet 1 is decoded in error, and sends a negative acknowledgment (NAK) to the terminal in time slot 2. The terminal receives the NAK and transmits the second data block (Block 2) for Packet 1 in time slot 3. The base station receives Block 2, processes Blocks 1 and 2, determines that Packet 1 is still decoded in error, and sends back a NAK in time slot 4. The block transmission and NAK response may continue any number of times. For the example shown in FIG. 3, the terminal transmits data block q (Block q) for Packet 1 in time slot m, where q≦Q. The base station receives Block q, processes Blocks 1 through q for Packet 1, determines that the packet is decoded correctly, and sends back an ACK in time slot m+1. The terminal receives the ACK and terminates the transmission of Packet 1. The terminal processes the next data packet (Packet 2) and transmits the data blocks for Packet 2 in similar manner.

In FIG. 3, there is a delay of one time slot for the ACK/NAK response for each block transmission. To improve channel utilization, the terminal may transmit multiple packets in an interlaced manner. For example, the terminal may transmit one packet in odd-numbered time slots and another packet in even-numbered time slots. More than two packets may also be interlaced for a longer ACK/NAK delay.

FIG. 3 shows transmission of both NAKs and ACKs. For an ACK-based scheme, which is assumed for the description below, an ACK is sent only if a packet is decoded correctly, and NAKs are not sent and presumed by the absence of ACKs.

Figure 4:
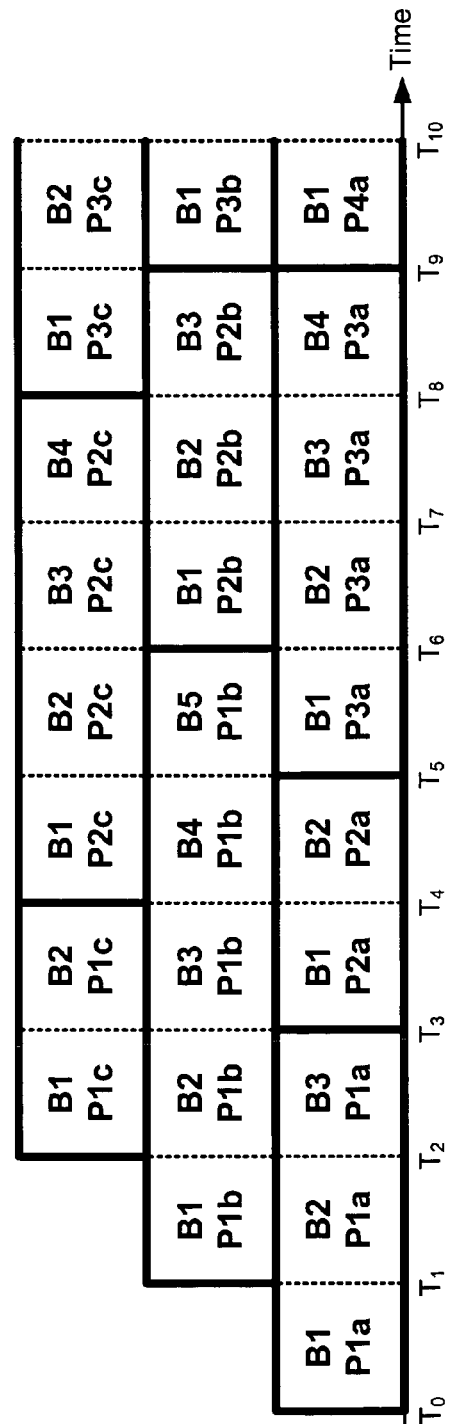
FIG. 4 shows H-ARQ transmissions for three terminals.

FIG. 4 shows H-ARQ transmissions for three terminals a, b and c. Each terminal may transmit a new packet starting in any time slot. Each terminal may also transmit any number of data blocks for each packet and may transmit another packet upon receiving an ACK for the current packet. The packets transmitted by each terminal thus appear asynchronous with respect to the packets transmitted by the other terminals.

With common overlapping, terminals a, b and c transmit on the same sequence of time-frequency blocks. Each terminal would then interfere with the other two terminals for each block transmission. With random overlapping, these terminals transmit on different sequences of time-frequency blocks. Each terminal may interfere with zero, one, or both of the other two terminals for each block transmission.

Figure 5:
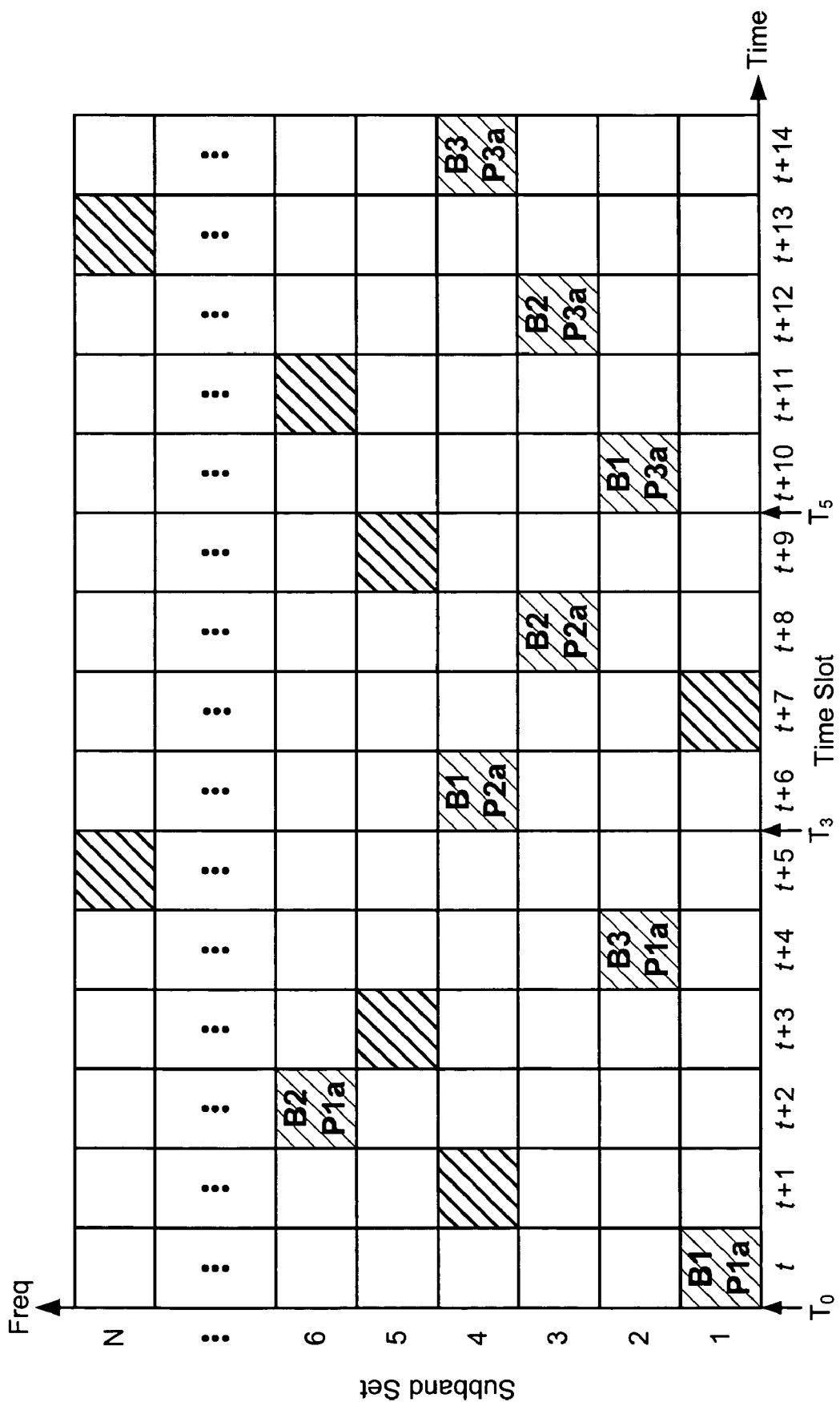
FIG. 5 shows an H-ARQ transmission on a time-frequency plane.

FIG. 5 shows H-ARQ transmission for terminal a on a time-frequency plane. The block transmissions from the terminal hop across frequency in different time slots. Each block transmission interferes with other terminals assigned the same time-frequency block.

Multiple terminals can transmit on the same time-frequency block with quasi-orthogonal multiplexing. As shown in FIGS. 4 and 5, each terminal observes interference from and causes interference to other overlapping terminals, which are terminals using the same time-frequency block. The overlapping terminals are different for random and common overlapping. Regardless of the type of overlapping, the interference can degrade performance for all affected terminals. The deleterious effects of interference may be mitigated as described below.

Each base station is equipped with multiple (R) antennas that may be used for data transmission and reception. Each terminal may be equipped with one or multiple antennas for data transmission and reception. On the reverse link, a base station may receive data from zero, one, or multiple terminals on each time-frequency block. In general, the number of terminals that may transmit on the same time-frequency block is limited by the number of antennas at the base station, which determines the base station's ability to separate out overlapping transmissions. For simplicity, the following description assumes that each terminal is equipped with a single antenna and that the base station receives transmissions from L terminals on each time-frequency block.

A single-input multiple-output (SIMO) channel is formed between the single antenna at a terminal and the R antennas at a base station. The SIMO channel may be characterized by an R×1 channel response vector $\underline{h}_u(k,t)$, which may be expressed as:

$$\underline{h}_u(k,t)=[h_{u,1}(k,t) h_{u,2}(k,t) \ldots h_{u,R}(k,t)]^T,  \quad \text{Eq (1)}$$

where $h_{u,j}(k,t)$, for $j=1, \ldots, R$, is the complex channel gain from the antenna at terminal u to base station antenna j for subband k in time slot t, and "$T$" denotes a transpose. Time slot t may span one or multiple symbol periods. For simplicity, the channel response is assumed to be constant over time slot t and is not a function of symbol period n.

A multiple-input multiple-output (MIMO) channel is formed between L antennas at L terminals and the R base station antennas. The MIMO channel may be characterized by an R×L channel response matrix $\underline{H}(k,t)$, which may be expressed as:

$$\underline{H}(k,t)=[\underline{h}_1(k,t) \underline{h}_2(k,t) \ldots \underline{h}_L(k,t)].  \quad \text{Eq (2)}$$

Each column of $\underline{H}(k,t)$ corresponds to a channel response vector for one terminal. The channel response matrix $\underline{H}(k,t)$ is dependent on the set of terminals using subband k in time slot t.

Each terminal may transmit data and pilot from its antenna to the base station. The base station obtains received symbols from the R antennas for the transmissions sent by the L terminals. The received symbols may be expressed as:

$$\underline{r}(k,t,n) = \underline{H}(k,t) \cdot \underline{s}(k,t,n) + \underline{n}(k,t,n) \quad \text{Eq (3)}$$

$$= \sum_{u=1}^{L} \underline{h}_u(k,t) \cdot s_u(k,t,n) + \underline{n}(k,t,n)$$

where $s_u(k,t,n)$ is a data symbol sent by terminal u on subband k in symbol period n of time slot t;
$\underline{s}(k,t,n)$ is an L×1 vector with L data symbols sent by the L terminals on subband k in symbol period n of time slot t;
$\underline{r}(k,t,n)$ is an R×1 vector with R received symbols obtained from the R base station antennas for subband k in symbol period n of time slot t; and
$\underline{n}(k,t,n)$ is a noise vector for subband k in symbol period n of time slot t.

As used herein, a data symbol is a modulation symbol for traffic/packet data, a pilot symbol is a symbol for pilot (which is data that is known a priori by both a transmitter and a receiver), a modulation symbol is a complex value for a point in a signal constellation for a modulation scheme (e.g., M-PSK or M-QAM), and a symbol is a complex value. For simplicity, the noise may be assumed to be additive white Gaussian noise (AWGN) with a zero mean vector and a covariance matrix of $\underline{\phi}_{nn}=\sigma_n^2 \cdot \underline{I}$, where $\sigma_n^2$ is the variance of the noise and $\underline{I}$ is the identity matrix.

The base station may use various receiver spatial processing techniques to separate out the overlapping transmissions on the same time-frequency block. These receiver spatial processing techniques include a zero-forcing (ZF) technique, a minimum mean square error (MMSE) technique, a maximal ratio combining (MRC) technique, and so on. The base station may derive an L×R spatial filter matrix based on the ZF, MMSE, or MRC technique, as follows:

$$\underline{M}_{zf}(k,t)=[\underline{H}^H(k,t) \cdot \underline{H}(k,t)]^{-1} \cdot \underline{H}^H(k,t), \quad \text{Eq (4)}$$

$$\underline{M}_{mmse}(k,t)=\underline{D}_{mmse}(k,t) \cdot [\underline{H}^H(k,t) \cdot \underline{H}(k,t)+\sigma^2 \cdot \underline{I}]^{-1} \cdot \underline{H}^H(k,t), \quad \text{Eq (5)}$$

$$\underline{M}_{mrc}(k,t)=\underline{D}_{mrc}(k,t) \cdot \underline{H}^H(k,t), \quad \text{Eq (6)}$$

where $\underline{D}_{mmse}(k,t)=\text{diag}\{[\underline{H}^H(k,t) \cdot \underline{H}(k,t)+\sigma^2 \cdot \underline{I}]^{-1} \cdot \underline{H}^H(k,t) \cdot \underline{H}(k,t)\}^{-1}$; and $\underline{D}_{mrc}(k,t)=\text{diag}[\underline{H}^H(k,t) \cdot \underline{H}(k,t)]^{-1}$.

The base station may derive an estimate of $\underline{H}(k,t)$ based on the pilots transmitted by the terminals. For simplicity, the description herein assumes no channel estimation error.

The base station may perform receiver spatial processing as follows:

$$\underline{\hat{s}}(k,t,n) = \underline{M}(k,t) \cdot \underline{r}(k,t,n) = \underline{s}(k,t,n) + \underline{\tilde{n}}(k,t,n), \qquad \text{Eq (7)}$$

where $\underline{M}(k,t)$ may be equal to $\underline{M}_{rf}(k,t)$, $\underline{M}_{mmse}(k,t)$, or $\underline{M}_{mrc}(k,t)$;

$\underline{\hat{s}}(k,t,n)$ is an L×1 vector with L detected symbols for subband k in symbol period n of time slot t; and $\underline{\tilde{n}}(k,t,n)$ is the noise after the receiver spatial processing.

A detected symbol is an estimate of a data symbol transmitted by a transmitter.

The base station may perform receiver spatial processing as shown in equation (7) for each subband k in each symbol period n to obtain detected symbols for that subband and symbol period. The base station may demultiplex the detected symbols for all subbands and symbol periods into separate streams of detected symbols for individual terminals. The base station may process (e.g., demodulate and decode) the detected symbols for each terminal (e.g., after each block transmission) to obtain a decoded packet for the terminal.

The base station may estimate the interference caused by each correctly decoded packet and subtract the estimated interference from the received symbols for the time-frequency blocks on which the packet is transmitted. If the estimated interference is reasonably accurate, then the interference-canceled symbols would have higher quality, and the likelihood of correctly decoding a pending packet sent on one or more of these time-frequency blocks would improve. A pending packet is a packet that has not been decoded correctly and for which decoding may be attempted. A packet is typically purged after the last block transmission has been received and decoding fails with all Q block transmissions for the packet.

To estimate the interference due to a correctly decoded packet d for terminal u, the base station first processes (e.g., encodes and modulates) packet d in the same manner performed by terminal u to obtain remodulated data symbols. The base station then estimates the interference due to packet d based on the remodulated data symbols and the channel response vectors for terminal u, as follows:

$$\underline{i}_u(k,t,n) = \underline{h}_u(k,t) \cdot s_u(k,t,n), \qquad \text{Eq (8)}$$

where $\underline{i}_u(k,t,n)$ is an R×1 vector of estimated interference due to packet d on subband k in symbol period t of time slot n.

The base station then cancels the estimated interference from input symbols to obtain interference-canceled symbols, as follows:

$$\underline{r}_{ic,u}(k,t,n) = \underline{r}_{ip}(k,t,n) - \underline{i}_u(k,t,n), \qquad \text{Eq (9)}$$

where $\underline{r}_{ip}(k,t,n)$ is an R×1 vector with R input symbols for subband k in symbol period n of time slot t; and $\underline{r}_{ic,u}(k,t,n)$ is an R×1 vector with R interference-canceled symbols for subband k in symbol period n of time slot t.

In general, the input symbols in $\underline{r}_{ip}(k,t,n)$ may be equal to the received symbols obtained from the base station antennas or interference-canceled symbols obtained from prior interference cancellation.

The base station performs receiver spatial processing on the interference-canceled symbols to obtain new detected symbols. If the interference from only terminal u has been canceled, then the base station first forms an R×(L−1) channel response matrix $\underline{H}_u(k,t)$ that contains all of the columns of $\underline{H}(k,t)$ except for the column for terminal u. The base station then derives an (L−1)×R spatial filter matrix $\underline{M}_u(k,t)$ based on $\underline{H}_u(k,t)$ and using the ZF, MMSE, or MRC technique. The base station then performs receiver spatial processing on the interference-canceled symbols with the spatial filter matrix $\underline{M}_u(k,t)$, as follows:

$$\underline{\hat{s}}_u(k,t,n) = \underline{M}_u(k,t) \cdot \underline{r}_u(k,t,n), \qquad \text{Eq (10)}$$

where $\underline{\hat{s}}_u(k,t,n)$ is an (L−1)×1 vector with L−1 new detected symbols for subband k in symbol period n of time slot t. These new detected symbols have the interference due to packet d from terminal u canceled.

Equations (8), (9), and (10) are for interference estimation, interference cancellation, and receiver spatial processing, respectively, for one subband k in one symbol period n of one time slot t. The base station performs interference estimation, interference cancellation, and receiver spatial processing for all subbands, symbol periods, and time slots used to transmit packet d. The base station then demultiplexes the new detected symbols for terminals that transmit on the time-frequency blocks used for packet d. The base station may decode each packet that overlaps at least partially with packet d based on the new and other detected symbols available for that packet.

The base station may perform interference estimation, interference cancellation, and receiver spatial processing whenever a packet is decoded correctly for any terminal. For the example shown in FIG. 4, the base station may decode packet P1a for terminal a after the first block transmission (B1) at time $T_1$, and again after the second block transmission (B2) at time $T_2$, and again after the third block transmission (B3) at time $T_3$. Upon correctly decoding packet P1a at time $T_3$, the base station may estimate and cancel the interference due to this packet from the input symbols for times $T_0$ through $T_3$. The base station may also decode each packet for terminals b and c after each block transmission. Upon correctly decoding packet P1c for terminal c at time $T_4$, the base station may estimate and cancel the interference due to this packet from the input symbols for times $T_2$ through $T_4$. Upon correctly decoding packet P1b for terminal b at time $T_6$, the base station may estimate and cancel the interference due to this packet from the input symbols for times $T_1$ through $T_6$. The same processing may be performed for the remaining transmissions.

Interference estimation and cancellation may be performed up to L−1 times on the input symbols for a given time-frequency block. Each time that interference estimation and cancellation is performed, the channel response matrix reduces by one column, the spatial filter matrix reduces by one row, the diversity order increases by one, new detected symbols are derived from the interference-canceled symbols for one fewer terminal, and the signal-to-noise-and-interference ratio (SINR) for the new detected symbols improves.

Interference estimation and cancellation may be performed for one or more correctly decoded packets for a given time-frequency block. The total interference $\underline{i}_t(k,t,n)$ for subband k in symbol period n of time slot t may be obtained by (1) forming a vector $\underline{s}_t(k,t,n)$ of data symbols for all correctly decoded packets for that subband and symbol period and (2) multiplying $\underline{s}_t(k,t,n)$ with a matrix $\underline{H}_t(k,t,n)$ of channel estimates for all correctly decoded packets for that subband and symbol period, or $\underline{i}_t(k,t,n) = \underline{H}_t(k,t,n) \cdot \underline{s}_t(k,t,n)$. The total interference may then be canceled from the input symbols $\underline{r}_{ip}(k,t,n)$ to obtain interference-canceled symbols $\underline{r}_{ic}(k,t,n)$, or $\underline{r}_{ic}(k,t,n) = \underline{r}_{ip}(k,t,n) - \underline{i}_t(k,t,n)$. The interference-canceled symbols $\underline{r}_{ic}(k,t,n)$ then replace (e.g., are stored over) the input symbols $\underline{r}_{ip}(k,t,n)$.

The base station may selectively perform interference estimation and cancellation, e.g., in order to reduce the amount of processing required for data reception.

The base station may decode the packets in various manners. In an embodiment, the base station decodes the packets from the terminals in a sequential order in each time slot. For the example shown in FIG. 4, the base station may decode the packet from terminal a first, then the packet from terminal b next, and then the packet from terminal c last. Whenever a packet is decoded correctly, the base station may estimate and cancel the interference due to the packet, and may decode each pending packet with the interference from the correctly decoded packet canceled. For example, at time $T_3$, the base station may estimate and cancel the interference due to correctly decoded packet P1a for terminal a, and may then decode packet P1b for terminal b and packet P1c for terminal c. At time $T_4$, the base station may estimate and cancel the interference due to correctly decoded packet P1c for terminal c, and may then re-decode packet P2a for terminal a and packet P1b for terminal b. Re-decoding refers to a new decoding attempt with new detected symbols. Alternatively, the base station may skip the re-decoding of packets P2a and P1b at time $T_4$ and may simply decode these packets with the new detected symbols at time $T_5$.

In another embodiment, the base station decodes the packets from all terminals essentially in parallel in each time slot. The base station then identifies all correctly decoded packets for the time slot and estimates and cancels the interference due to these packets. The base station may then re-decode each packet that overlaps at least partially with any correctly decoded packet.

In yet another embodiment, the base station performs sequential interference cancellation and decoding. The base station decodes the packets from all terminals essentially in parallel in each time slot and identifies all correctly decoded packets for the time slot. The base station estimates and cancels the interference due to the correctly decoded packet from the strongest terminal and then re-decodes each packet that overlaps at least partially with this correctly decoded packet. If any packet is still decoded in error, then the base station estimates and cancels the interference due to the correctly decoded packet from the next strongest user (if any) and then re-decodes each packet that overlaps at least partially with this correctly decoded packet. The sequential process continues until either (1) all correctly decoded packets have been canceled or (2) all packets are correctly decoded.

In general, the base station may (1) re-decode a packet whenever new detected symbols are obtained for the packet as a result of canceling the interference due to packets decoded correctly or (2) decode the packet after the next block transmission for the packet. Re-decoding the packet whenever new detected symbols are obtained may result in earlier termination of the packet and may improve system performance at the expense of more decoding attempts. The base station may also selectively perform re-decoding. For example, the base station may re-decode a packet if (1) the last block transmission has been received for the packet, (2) new detected symbols are obtained for B or more data blocks, where B may be any value one or greater, (3) new detected symbols are obtained for a predetermined percentage or more of all symbols received for the packet, or (4) some other criterion is satisfied.

Figure 6:
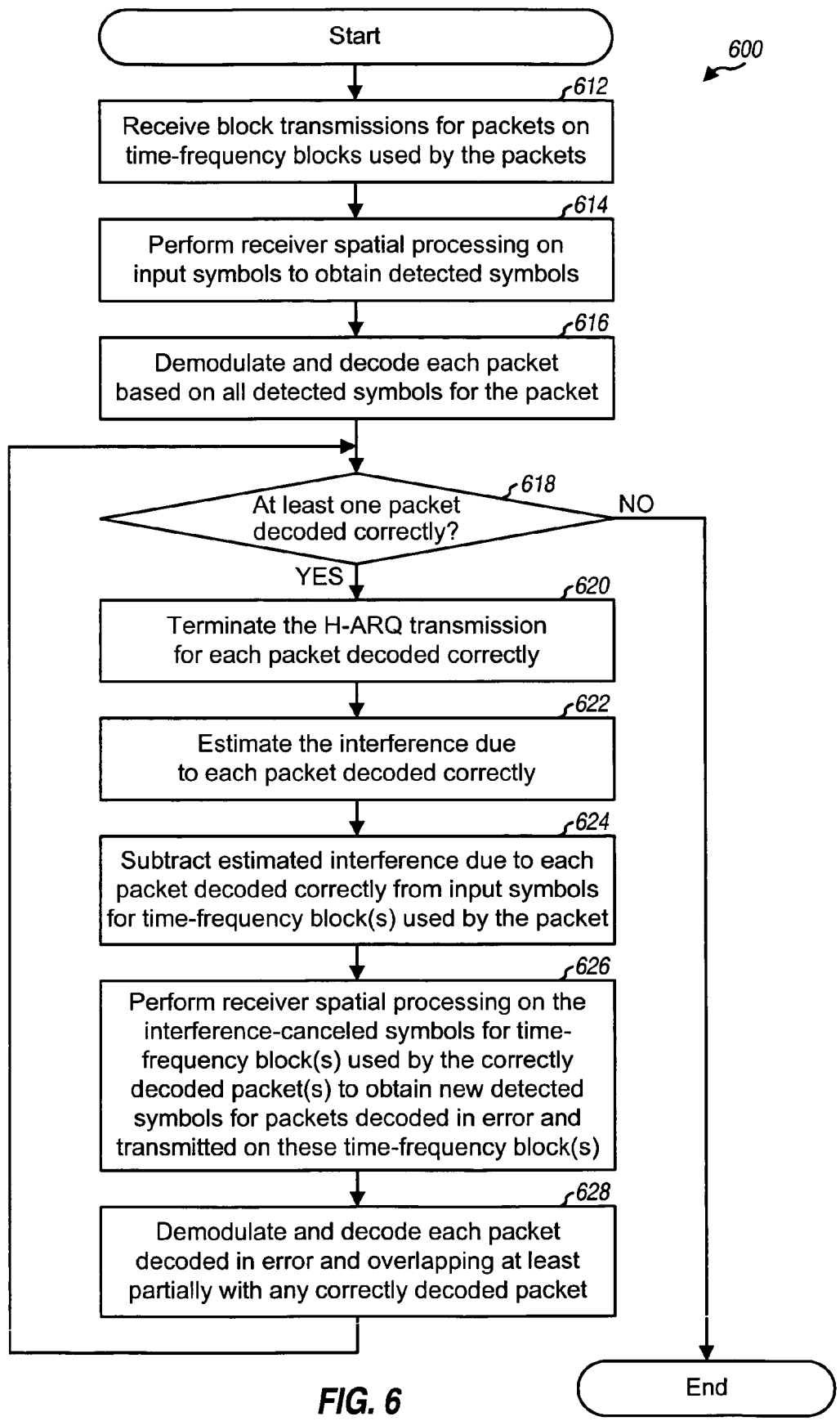
FIG. 6 shows a process for receiving packets sent with H-ARQ.

FIG. 6 shows a process 600 for receiving packets sent with H-ARQ. Process 600 may be performed by a base station for each time slot in which new block transmissions are received. The base station receives block transmissions for packets on time-frequency blocks used by these packets (block 612). The base station estimates the channel response for each terminal that sends a block transmission and performs receiver spatial processing on input symbols with the channel estimates to obtain detected symbols (block 614). The base station then demodulates and decodes each packet based on all detected symbols obtained for all block transmissions received for the packet (block 616).

A determination is then made whether at least one packet has been decoded correctly (block 618). If the answer is 'No', then the process terminates. Otherwise, the H-ARQ transmission for each packet decoded correctly is terminated, e.g., by sending an ACK for the packet (block 620). The interference due to each packet decoded correctly is estimated, e.g., by encoding and modulating the packet and multiplying the resultant symbols with the channel estimates for the packet (block 622). The estimated interference due to each packet decoded correctly is subtracted from the input symbols for the time-frequency block(s) used by the packet (block 624).

The base station then performs receiver spatial processing on the interference-canceled symbols for the time-frequency block(s) used by the correctly decoded packet(s) to obtain new detected symbols for packets decoded in error and transmitted on the same time-frequency block(s) as the correctly decoded packet(s) (block 626). The base station may demodulate and decode each packet decoded in error and overlapping at least partially with any of the correctly decoded packet(s) (block 628). One or more packets may be decoded correctly in block 628 as a result of canceling the interference due to the correctly decoded packet(s). The process then returns to block 618 to determine whether any packet has been decoded correctly in block 628 and, if yes, to perform interference cancellation and decoding once more.

Figure 7:
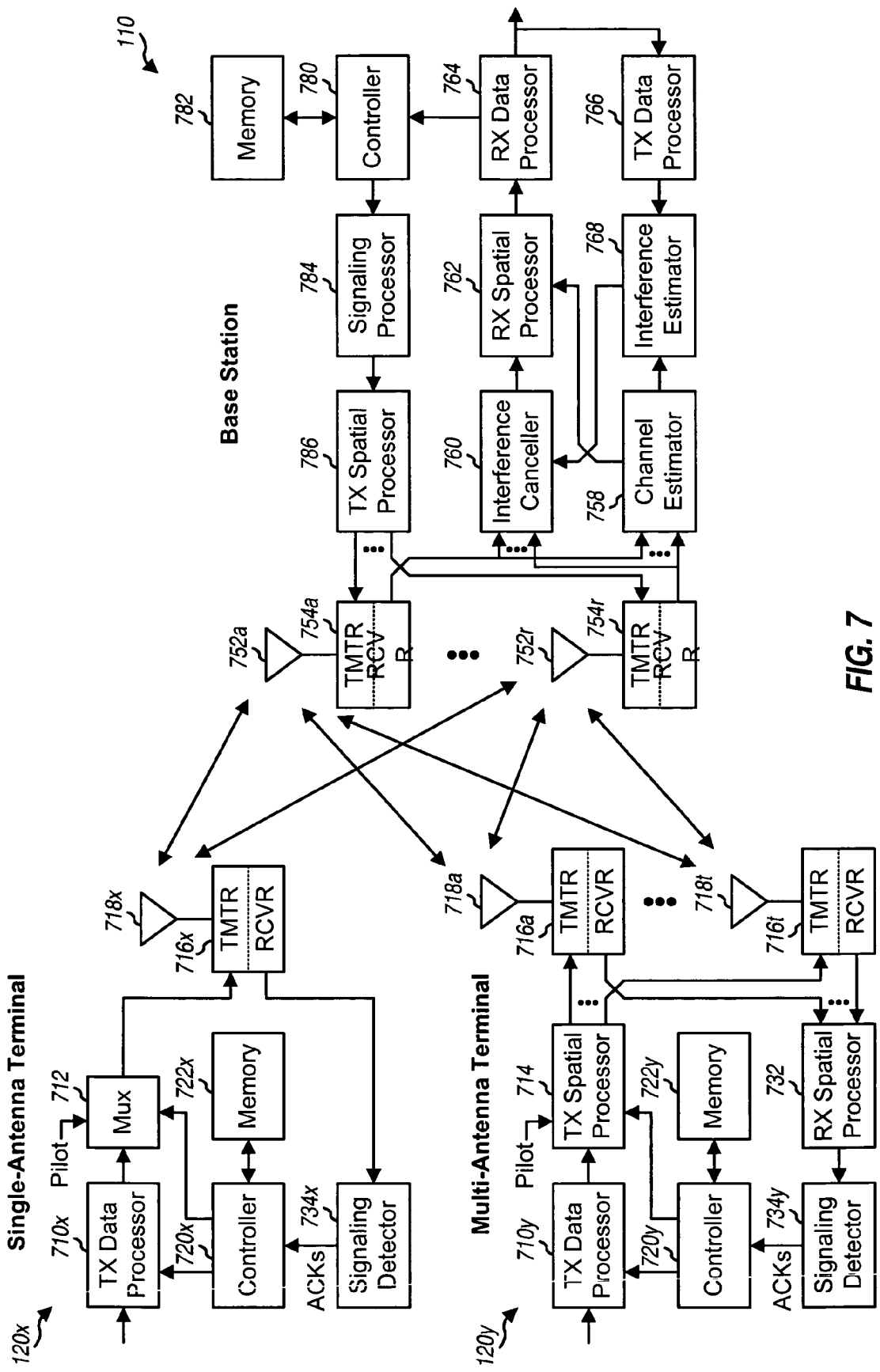
FIG. 7 shows a block diagram of a base station and two terminals.

FIG. 7 shows a block diagram of one base station 110 and two terminals 120x and 120y for data transmission on the reverse link. Terminal 120x is equipped with a single antenna 718x, terminal 120y is equipped with multiple (T) antennas 718a through 718t, and base station 110 is equipped with R antennas 752a through 752r.

At each terminal 120, a TX data processor 710 processes (e.g., encodes and modulates) traffic/packet data and generates data symbols. At terminal 120x, a multiplexer (Mux) 712 multiplexes data symbols with pilot symbols and provides a stream of transmit symbols to a transmitter unit (TMTR) 716x. Each transmit symbol is a symbol to be sent from one antenna on one subband in one symbol period. At terminal 120y, a TX spatial processor 714 performs spatial processing on the data symbols, multiplexes in pilot symbols, and provides T streams of transmit symbols to T transmitter units 716a through 716t. The pilot symbols for overlapping terminals may be generated with different orthogonal codes or multiplexed in some other manner to allow the base station to estimate the channel response for each terminal. For both terminals 120x and 120y, each transmitter unit 716 processes its transmit symbol stream and generates a reverse link (RL) modulated signal, which is transmitted from an associated antenna 718.

At base station 110, R antennas 752a through 752r receive the RL modulated signals transmitted by the terminals, and each antenna provides a received signal to a respective receiver unit (RCVR) 754. Each receiver unit 754 performs processing complementary to the processing performed by transmitter units 716, provides received pilot symbols to a channel estimator 758, and provides received data symbols to an interference canceller 760. Channel estimator 758 derives an RL channel estimate for each terminal 120 based on the pilot received from that terminal. Interference canceller 760 receives estimated interference due to correctly decoded packets, cancels the estimated interference from the input symbols, and provides interference-canceled symbols to an RX spatial processor 762. The interference-canceled symbols are equal to the received symbols if interference cancellation is not performed.

RX spatial processor 762 performs receiver spatial processing on the interference-canceled symbols with the RL channel estimates from channel estimator 758 and provides detected symbols. An RX data processor 764 processes (e.g., demodulates and decodes) the detected symbols and provides decoded packets for each terminal. A TX data processor 766 processes (e.g., encodes and modulates) each correctly decoded packet and provides remodulated data symbols. An interference estimator 768 estimates the interference due to each correctly decoded packet and provides the estimated interference to interference canceller 760.

For H-ARQ, RX data processor 764 may decode a packet after each block transmission for the packet. A controller 780 receives the decoding result for each block transmission and generates an ACK if the packet is decoded correctly. The ACKs for all terminals are processed by a signaling processor 784 and a TX spatial processor 786, conditioned by transmitter units 754, and transmitted from antennas 752. At each terminal 120, the forward link signals transmitted by base station 110 are received by antenna(s) 718 and conditioned by receiver unit(s) 716 to obtain received symbols. At terminal 120x, a signaling detector 734x processes the received symbols and provides ACKs sent for terminal 120x. At terminal 120y, the received symbols are processed by an RX spatial processor 732 and a signaling detector 734y to obtain ACKs sent for terminal 120y. Controllers 720x and 720y control the transmission of blocks and packets for terminals 120x and 120y, respectively, based on the ACKs provided by signaling detectors 734x and 734y, respectively.

Controllers 720x, 720y and 780 control the operation of various processing units at terminals 120x and 120y and base station 110, respectively. Memory units 722x, 722y and 782 store data and program codes used by controllers 720x, 720y and 780, respectively.

Figure 8:
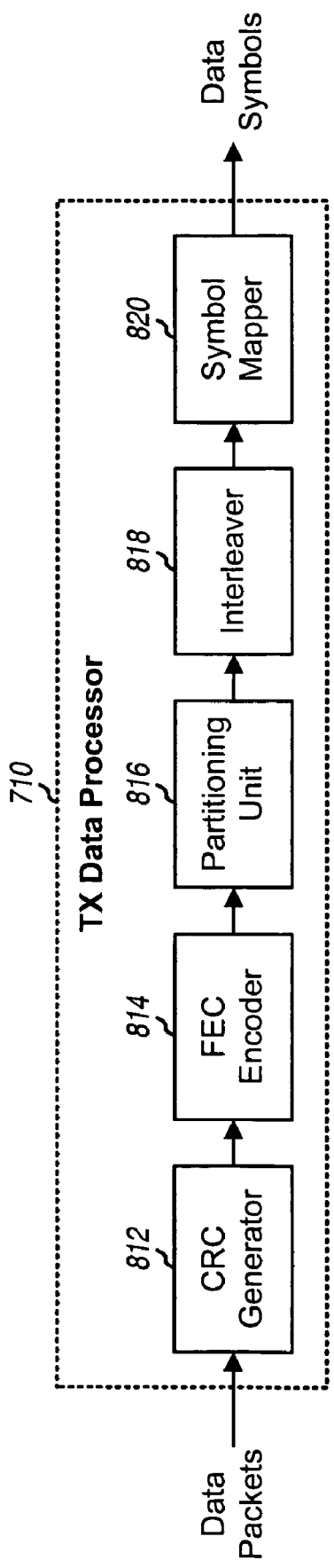
FIG. 8 shows a block diagram of a transmit (TX) data processor.

FIG. 8 shows a block diagram of an embodiment of a TX data processor 710, which may be used for TX data processors 710x, 710y, and 766 in FIG. 7. For clarity, the processing for one data packet is described below. Within TX data processor 710, a cyclic redundancy check (CRC) generator 812 generates a CRC value for the data packet and appends the CRC value to the data packet to form a formatted packet. The CRC value is used by a receiver to check whether the packet is decoded correctly or in error. Other error detection codes besides CRC may also be used. A forward error correction (FEC) encoder 814 then encodes the formatted packet in accordance with a selected coding scheme or code rate and provides a coded packet. FEC encoder 814 may implement a block code, a convolutional code, a Turbo code, some other code, or a combination thereof.

A partitioning unit 816 partitions the coded packet into Q coded subpackets, where Q may be dependent on the rate selected for the packet. The first coded subpacket may contain all systematic bits and zero or more parity bits. This allows the receiver to recover the data packet with just the first coded subpacket under favorable channel conditions. The other Q−1 coded subpackets may contain the remaining parity bits, with each subpacket containing parity bits taken across the entire coded packet. An interleaver 818 receives the Q coded subpackets, interleaves (i.e., reorders) the code bits in each subpacket in accordance with an interleaving scheme, and provides one interleaved subpacket at a time. The interleaving provides time, frequency, and/or spatial diversity for the code bits. A symbol mapper 820 maps the interleaved data in each subpacket to modulation symbols based on a selected modulation scheme. Symbol mapper 820 provides a block of data symbols for each coded subpacket.

Multi-antenna terminal 120y may transmit one or multiple streams from the T antennas. For example, terminal 120y may perform beamforming and transmit one stream of data and pilot from all T antennas. Base station 110 would then obtain a composite RL channel estimate for all T antennas, and the channel response matrix $\underline{H}(k,t)$ would include a single column for all T antennas. As another example, terminal 120y may transmit one stream of data and pilot from each of the T antennas. Base station 110 would then obtain an RL channel estimate for each antenna, and the channel response matrix $\underline{H}(k,t)$ would include T columns for the T antennas. Terminal 120y may also transmit multiple streams from the T antennas in other manners.

Figure 9:
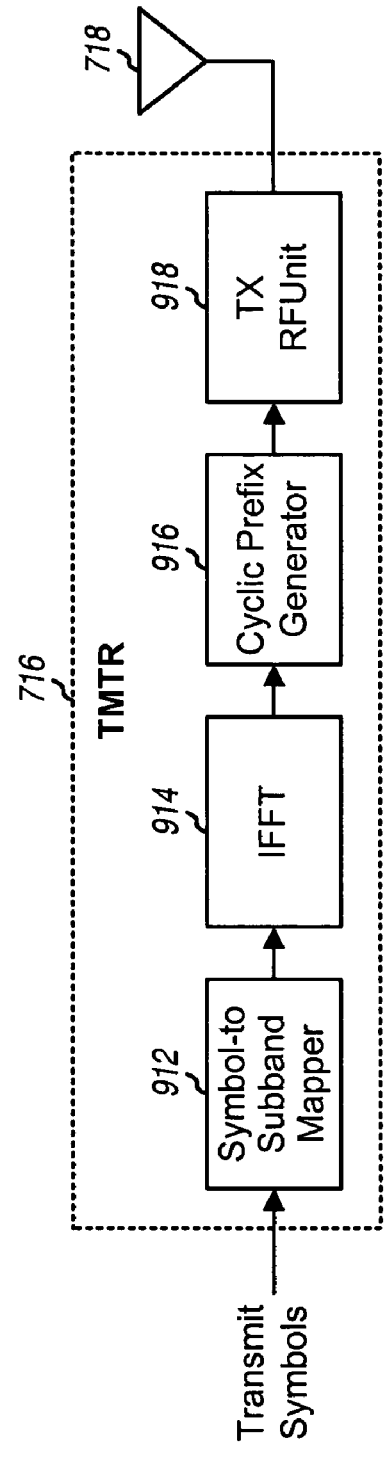
FIG. 9 shows a block diagram of a transmitter unit for one antenna.

FIG. 9 shows a block diagram of an embodiment of transmitter unit 716 for one antenna. Within transmitter unit 716, a symbol-to-subband mapper 912 maps the transmit symbols onto the proper subbands used for data transmission, maps zero symbols (which are signal values of zero) onto unused subbands, and provides output symbols. An inverse fast Fourier transform (IFFT) unit 914 transforms each set of K output symbols for the K total subbands to the time domain with a K-point IFFT and provides a transformed symbol that contains K time-domain chips. A cyclic prefix generator 916 repeats C chips of each transformed symbol and generates an OFDM symbol that contains K+C chips. The repeated portion is called a cyclic prefix and is used to combat intersymbol interference (ISI) caused by frequency selective fading. A TX radio frequency (RF) unit 918 conditions (e.g., converts to analog, filters, amplifies, and frequency upconverts) the stream of chips from generator 916 and generates a modulated signal for transmission from the associated antenna.

Figure 10:
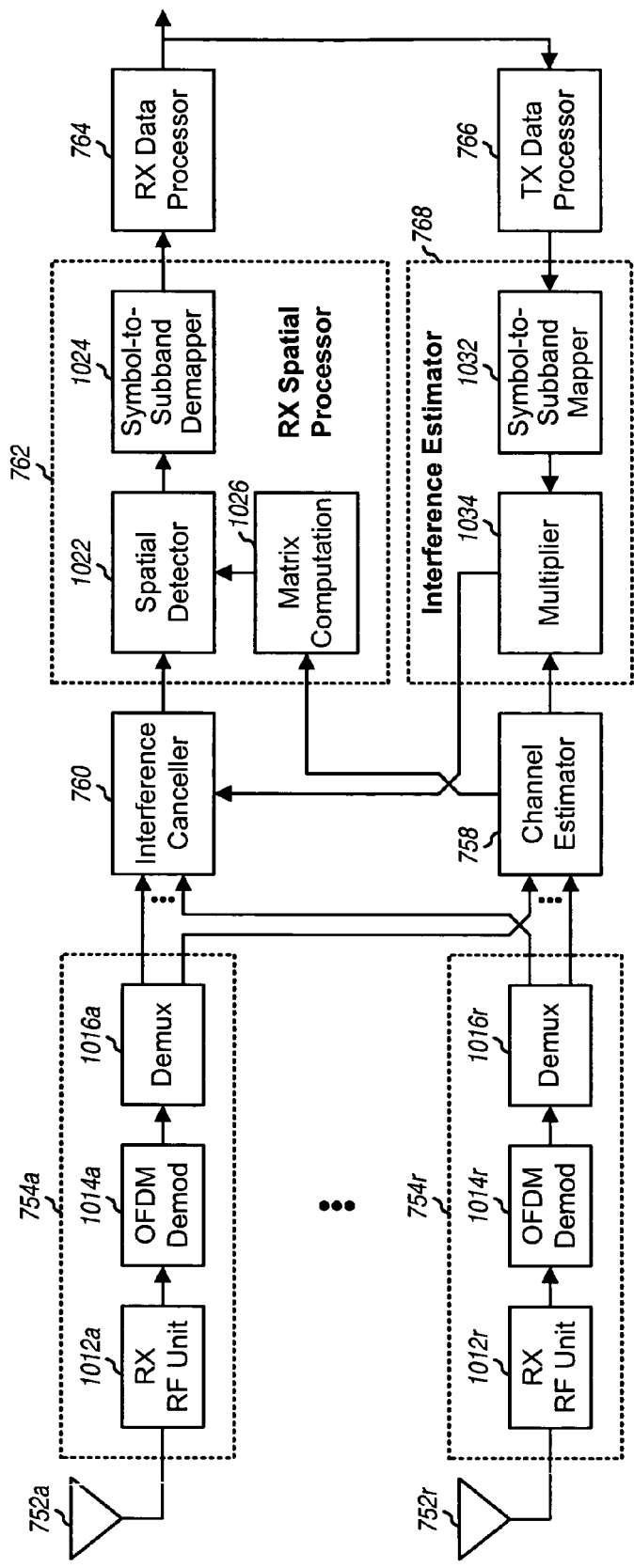
FIG. 10 shows a block diagram of a portion of the base station.

FIG. 10 shows a block diagram of a portion of base station 110. R antennas 752a through 752r receive the modulated signals from terminals 120 and provide R received signals to R receiver units 754a through 754r, respectively. Within each receiver unit 754, an RX RF unit 1012 conditions and digitizes a received signal and provides a stream of samples. An OFDM demodulator (Demod) 1014 performs OFDM demodulation on the sample stream by (1) removing the cyclic prefix in each received OFDM symbol to obtain a received transformed symbol and (2) transforming each received transformed symbol to the frequency domain with a K-point fast Fourier transform (FFT) to obtain K received symbols for the K subbands. A demultiplexer (Demux) 1016 demultiplexes the received symbols, provides received pilot symbols to channel estimator 758, and provides received data symbols to interference canceller 760. Interference canceller 760 subtracts the estimated interference from the input symbols and provides interference-canceled symbols. The estimated interference is equal to zero for time-frequency blocks without interference cancellation.

RX spatial processor 762 includes a spatial detector 1022, a symbol-to-subband demapper 1024, and a matrix computation unit 1026. Unit 1026 receives the channel estimates from channel estimator 758, forms a channel response matrix for each subband in each time slot, and generates a spatial filter matrix based on the channel response matrix. Spatial detector 1022 performs receiver spatial processing on the interference-canceled symbols with the spatial filter matrix and provides detected symbols. Demapper 1024 demultiplexes the detected symbols for the K total subbands and provides a stream of detected symbols for each terminal.

Interference estimator 768 includes a symbol-to-subband mapper 1032 and a multiplier 1034. Mapper 1032 receives from TX data processor 766 the remodulated data symbols for correctly decoded packets and maps these symbols onto the proper subbands. Multiplier 1034 multiplies each remodulated data symbol with the proper channel response vector and provides the estimated interference.

Figure 11:
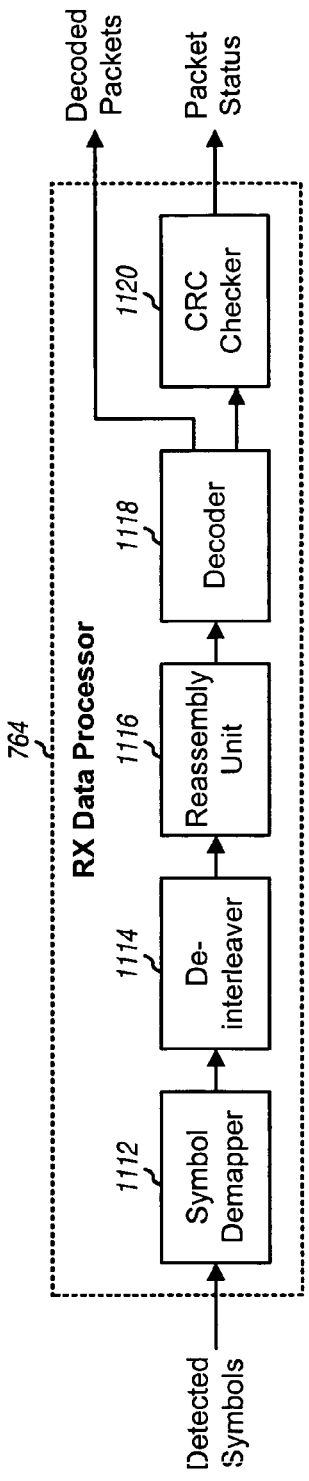
FIG. 11 shows a block diagram of a receive (RX) data processor.

FIG. 11 shows a block diagram of an embodiment of RX data processor 764. For clarity, the processing for one packet from one terminal is described below. Within RX data processor 764, a symbol demapper 1112 receives detected symbols for each block transmission, demodulates the detected symbols in accordance with the modulation scheme used for the block, and provides a block of demodulated data to a deinterleaver 1114. Deinterleaver 1114 is initialized with erasures prior to receiving the first block for the data packet. An erasure is a value that substitutes for a missing code bit (e.g., a code bit not yet received) and is given appropriate weight in the decoding process. Deinterleaver 1114 deinterleaves each block of demodulated data in a manner complementary to the interleaving performed for that block Whenever a block transmission or new detected symbols are received for the packet, the decoding can be performed anew on all blocks received for that packet. A reassembly unit 1116 forms a packet of deinterleaved data that contains (1) deinterleaved data for all blocks received for the packet and (2) erasures for blocks not received for the packet. Reassembly unit 1116 performs reassembly in a complementary manner to the partitioning performed by the terminal. An FEC decoder 1118 decodes the deinterleaved data packet in a manner complementary to the FEC encoding performed by the terminal and provides a decoded packet. For example, FEC decoder 1118 may be a Turbo decoder or a Viterbi decoder if the terminal performs Turbo or convolutional coding, respectively. A CRC checker 1120 checks the decoded packet, determines whether the packet is decoded correctly or in error, and provides the status of the decoded packet.

For clarity, the data reception techniques have been specifically described for reverse link transmissions. These techniques may also be used for forward link transmissions. A terminal may receive packets from multiple base stations and may process these packets with interference cancellation in the manner described above.

The data reception techniques described herein may be implemented by various means. For example, these techniques may be implemented in hardware, software, or a combination thereof. For a hardware implementation, the processing units, e.g. processors and controllers, used for data reception may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For example, interference estimator 768, interference canceller 760, RX spatial processor 762, RX data processor 764, and TX data processor 766 may be implemented on one or more processors, DSPs, and so on. Interference estimator 768 and interference canceller 760 may be implemented with an interference processor, or may be part of a processor that also implements RX spatial processor 762. Various other implementations of the processing units are also possible.

For a software implementation, the techniques may be implemented with modules (e.g., procedures, functions, and so on) that perform the functions described herein. The software codes may be stored in a memory unit (e.g., memory unit 782 in FIG. 7) and executed by a processor (e.g., controller 780). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   an interference processor operative to obtain input symbols for multiple antennas, to estimate interference due to a correctly decoded packet received via at least one time-frequency block among a plurality of time-frequency blocks, and to subtract the estimated interference from input symbols for the at least one time-frequency block to obtain interference-canceled symbols;
   a spatial processor operative to perform receiver spatial processing on the interference-canceled symbols and provide detected symbols for the at least one time-frequency block; and
   a receive data processor operative to demodulate and decode detected symbols for at least one packet that overlaps at least partially with the correctly decoded packet.

2. The apparatus of claim 1, wherein each time-frequency block corresponds to at least one subcarrier in at least one symbol period, and wherein the at least one subcarrier for each time-frequency block is among a plurality of subcarriers formed with orthogonal frequency division multiplexing (OFDM), interleaved frequency division multiple access (IFDMA), or narrowband frequency division multiple access (NFDMA).

3. The apparatus of claim 1, further comprising:
   a controller operative to determine a set of at least one subcarrier for each of the at least one time-frequency block based on a frequency hopping pattern used for the packet.

4. The apparatus of claim 1, wherein the spatial processor is operative to perform receiver spatial processing on the input symbols for the at least one time-frequency block to obtain detected symbols for the packet, and wherein the receive data processor is operative to demodulate and decode the detected symbols for the packet.

5. The apparatus of claim 1, further comprising:
   a transmit data processor operative to generate data symbols for the packet, and wherein the interference processor is operative to multiply the data symbols for the packet with channel estimates for the packet to obtain the estimated interference due to the packet.

6. The apparatus of claim 1, wherein the receive data processor is operative to assemble detected symbols for each of the at least one packet based on the detected symbols obtained from the interference-canceled symbols and detected symbols obtained from received symbols without interference cancellation.

7. A method of processing data in a wireless communication system, comprising:
   obtaining input symbols for multiple antennas;

estimating interference due to a correctly decoded packet received via at least one time-frequency block among a plurality of time-frequency blocks;

subtracting the estimated interference from input symbols for the at least one time-frequency block to obtain interference-canceled symbols; and processing the interference-canceled symbols for at least one packet that overlaps at least partially with the correctly decoded packet.

8. The method of claim 7, wherein each time-frequency block corresponds to at least one subcarrier in at least one symbol period, and wherein the at least one subcarrier for each time-frequency block is among a plurality of subcarriers formed with orthogonal frequency division multiplexing (OFDM), interleaved frequency division multiple access (IFDMA), or narrowband frequency division multiple access (NFDMA).

9. The method of claim 7, further comprising:
determining a set of at least one subcarrier for each of the at least one time-frequency block based on a frequency hopping pattern used for the packet.

10. The method of claim 7, further comprising:
performing receiver spatial processing on the input symbols for the at least one time-frequency block to obtain detected symbols for the packet; and
demodulating and decoding the detected symbols for the packet.

11. The method of claim 7, wherein the estimating the interference due to the packet comprises
generating data symbols for the packet based on coding and modulation schemes used for the packet, and
multiplying the data symbols for the packet with channel estimates for the packet.

12. The method of claim 7, wherein the processing the interference-canceled symbols comprises
performing receiver spatial processing on the interference-canceled symbols to obtain detected symbols for the at least one time-frequency block, and
demodulating and decoding detected symbols for each of the at least one packet.

13. An apparatus comprising:
means for obtaining input symbols for multiple antennas;
means for estimating interference due to a correctly decoded packet received via at least one time-frequency block among a plurality of time-frequency blocks;
means for subtracting the estimated interference from input symbols for the at least one time-frequency block to obtain interference-canceled symbols; and
means for processing the interference-canceled symbols for at least one packet that overlaps at least partially with the correctly decoded packet.

14. The apparatus of claim 13, further comprising:
means for determining a set of at least one subcarrier for each of the at least one time-frequency block based on a frequency hopping pattern used for the packet.

15. The apparatus of claim 13, wherein the means for estimating the interference due to the packet comprises
means for generating data symbols for the packet based on coding and modulation schemes used for the packet, and
means for multiplying the data symbols for the packet with channel estimates for the packet.

16. The apparatus of claim 13, wherein the means for processing the interference-canceled symbols comprises
means for performing receiver spatial processing on the interference-canceled symbols to obtain detected symbols for the at least one time-frequency block, and
means for demodulating and decoding detected symbols for each of the at least one packet.

17. An apparatus comprising:
a receive data processor operative to receive a plurality of packets, each packet being sent in a variable number of symbol blocks, and to decode each of the plurality of packets;
a controller operative to generate a signal to terminate transmission of each of at least one packet decoded correctly among the plurality of packets; and
an interference processor operative to estimate interference due to each packet decoded correctly and to cancel the estimated interference due to each packet decoded correctly, and wherein the receive data processor is operative to decode each of one or more packets overlapping at least partially with the at least one packet decoded correctly.

18. The apparatus of claim 17, wherein the receive data processor is operative to receive each of the plurality of packets via a hybrid automatic repeat request (H-ARQ) transmission for the packet.

19. The apparatus of claim 17, wherein the controller is operative to send an acknowledgment (ACK) for each packet decoded correctly to terminate the transmission of the packet.

20. The apparatus of claim 17, wherein the receive data processor is operative to receive at least one symbol block for each of the plurality of packets and to decode each of the plurality of packets based on the at least one symbol block received for the packet.

21. The apparatus of claim 17, further comprising:
a plurality of receiver units operative to receive each of the plurality of packets via at least one time-frequency block used for the packet.

22. The apparatus of claim 21, wherein each time-frequency block for each packet corresponds to at least one subcarrier in at least one symbol period, and wherein the at least one subcarrier for each time-frequency block is among a plurality of subcarriers formed with orthogonal frequency division multiplexing (OFDM), interleaved frequency division multiple access (IFDMA), or narrowband frequency division multiple access (NFDMA).

23. The apparatus of claim 21, wherein the at least one time-frequency block for each of the plurality of packets is pseudo-random with respect to the at least one time-frequency block for each remaining one of the plurality of packets.

24. The apparatus of claim 17, wherein the controller is operative to determine at least one time-frequency block used for each packet decoded correctly, and wherein the interference processor is operative to cancel the estimated interference due to each packet decoded correctly from the at least one time-frequency block used for the packet decoded correctly.

25. The apparatus of claim 17, wherein the controller is operative to estimate an amount of interference due to each of the at least one packet decoded correctly, and wherein the interference processor is operative to estimate and cancel the interference due to each packet decoded correctly if the estimated amount of interference exceeds a predetermined threshold.

26. The apparatus of claim 17, further comprising:
a plurality of receiver units operative to receive the plurality of packets from a plurality of terminals via a reverse link.

27. An apparatus comprising:
means for receiving a plurality of packets, each packet being sent in a variable number of symbol blocks;

means for decoding each of the plurality of packets;
means for terminating transmission of each of at least one packet decoded correctly;
means for estimating interference due to each packet decoded correctly;
means for canceling the estimated interference due to each packet decoded correctly; and
means for decoding each of one or more packets overlapping at least partially with the at least one packet decoded correctly.

28. The apparatus of claim 27, further comprising:
means for receiving each of the plurality of packets via a hybrid automatic repeat request (H-ARQ) transmission for the packet.

29. The apparatus of claim 27, further comprising:
means for receiving each of the plurality of packets via at least one time-frequency block used for the packet, and wherein the at least one time-frequency block for each of the plurality of packets is pseudo-random with respect to the at least one time-frequency block for each remaining one of the plurality of packets.

30. A computer readable medium for processing data in a wireless communication system, encoded with a computer program comprising:
code for causing a computer to obtain input symbols for multiple antennas, to estimate interference due to a correctly decoded packet received via at least one time-frequency block among a plurality of time-frequency blocks, and to subtract the estimated interference from input symbols for the at least one time-frequency block to obtain interference-canceled symbols;
code for causing a computer to perform receiver spatial processing on the interference-canceled symbols and provide detected symbols for the at least one time-frequency block; and
code for causing a computer to demodulate and decode detected symbols for at least one packet that overlaps at least partially with the correctly decoded packet.

31. The computer readable medium of claim 30, wherein each time-frequency block corresponds to at least one subcarrier in at least one symbol period, and wherein the at least one subcarrier for each time-frequency block is among a plurality of subcarriers formed with orthogonal frequency division multiplexing (OFDM), interleaved frequency division multiple access (IFDMA), or narrowband frequency division multiple access (NFDMA).

32. The computer readable medium of claim 30, further comprising:
code for causing a computer to determine a set of at least one subcarrier for each of the at least one time-frequency block based on a frequency hopping pattern used for the packet.

33. The computer readable medium of claim 30, further comprising:
code for causing a computer to perform receiver spatial processing on the input symbols for the at least one time-frequency block to obtain detected symbols for the packet; and
code for causing a computer to demodulate and decode the detected symbols for the packet.

34. The computer readable medium of claim 30, further comprising:
code for causing a computer to generate data symbols for the packet; and
code for causing a computer to multiply the data symbols for the packet with channel estimates for the packet to obtain the estimated interference due to the packet.

35. The computer readable medium of claim 30, further comprising:
code for causing a computer to assemble detected symbols for each of the at least one packet based on the detected symbols obtained from the interference-canceled symbols and detected symbols obtained from received symbols without interference cancellation.

* * * * *